United States Patent
Liu et al.

(10) Patent No.: US 11,835,825 B2
(45) Date of Patent: Dec. 5, 2023

(54) DISPLAY PANEL, MANUFACTURING METHOD THEREOF, AND DISPLAY DEVICE

(71) Applicants: Hefei BOE Display Technology Co., Ltd., Anhui (CN); BOE Technology Group Co., Ltd., Beijing (CN)

(72) Inventors: Qi Liu, Beijing (CN); Wei Zhang, Beijing (CN); Xipeng Wang, Beijing (CN); Jilei Gao, Beijing (CN); Yonggang Zhang, Beijing (CN); Xin Zhou, Beijing (CN); Chao Li, Beijing (CN); Bin Li, Beijing (CN); Benzhi Xu, Beijing (CN)

(73) Assignees: HEFEI BOE DISPLAY TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/500,233

(22) Filed: Oct. 13, 2021

(65) Prior Publication Data
US 2022/0252921 A1  Aug. 11, 2022

(30) Foreign Application Priority Data
Feb. 5, 2021  (CN) .......... 202120336198.6

(51) Int. Cl.
*G02F 1/1339* (2006.01)
*G02F 1/1362* (2006.01)

(52) U.S. Cl.
CPC .... *G02F 1/13392* (2013.01); *G02F 1/136209* (2013.01); *G02F 1/136286* (2013.01)

(58) Field of Classification Search
None
See application file for complete search history.

(56) References Cited

U.S. PATENT DOCUMENTS

2016/0238903 A1* 8/2016 Morimoto ......... G02F 1/136286

* cited by examiner

*Primary Examiner* — Richard H Kim
(74) *Attorney, Agent, or Firm* — Nath, Goldberg & Meyer; Joshua B. Goldberg

(57) ABSTRACT

The present disclosure provides a display panel, a manufacturing method thereof, and a display device. The display panel includes: a first substrate and a second substrate arranged opposite to each other, and a first spacer located between the first substrate and the second substrate, both ends of the first spacer are in contact with the first substrate and the second substrate respectively; a surface of the first substrate close to the second substrate includes a recess, and an end of the first spacer in contact with the first substrate is embedded in the recess.

18 Claims, 3 Drawing Sheets

DISPLAY PANEL, MANUFACTURING METHOD THEREOF, AND DISPLAY DEVICE

CROSS-REFERENCE TO RELATED APPLICATION

This application claims the benefit of priority to Chinese Patent Application No. 202120336198.6 filed on Feb. 5, 2021, the contents of which are incorporated herein in their entirety by reference.

TECHNICAL FIELD

The present disclosure belongs to the field of display technology, and specifically relates to a display panel, a manufacturing method, and a display device.

BACKGROUND

With the improvement of the quality of life, display products with ultra-narrow bezel are becoming more and more popular among consumers. In order to ensure conditions such as transmittance, contrast, and color gamut in product design process, the cell thickness of a liquid crystal cell is generally reduced in a certain extent in the actual design process.

SUMMARY

The present disclosure is intended to solve at least one of the technical problems existing in the prior art and provide a display panel, a manufacturing method thereof, and a display device.

In a first aspect, embodiments of the present disclosure provide a display panel, including a first substrate and a second substrate opposite to each other, and a first spacer between the first substrate and the second substrate, wherein one end of the first spacer is in contact with the first substrate and the other end of the first spacer is in contact with the second substrate; a surface of the first substrate close to the second substrate includes a recess, and the end of the first spacer in contact with the first substrate is embedded in the recess.

In the embodiments of the present disclosure, the first substrate includes a first base substrate, and a first signal line and a second signal line on the first base substrate; an orthographic projection of the recess on the first base substrate is between orthographic projections of the first signal line and the second signal line on the first base substrate.

In the embodiments of the present disclosure, the first substrate further includes a protective layer on a side of the first signal line and the second signal line away from the first base substrate, the protective layer includes a first portion on the first signal line and the second signal line, and a second portion between the first signal line and the second signal line, a distance between a surface of the second portion facing the second substrate and the first base substrate is smaller than a distance between a surface of the first portion facing the second substrate and the first base substrate, and the surface of the second portion facing the second substrate is the recess.

In the embodiments of the present disclosure, a first edge of the orthographic projection of the recess on the first base substrate overlaps with an edge, close to the recess, of an orthographic projection of the first signal line on the first base substrate, and a second edge, opposite to the first edge, of the orthographic projection of the recess on the first base substrate overlaps with an edge, close to the recess, of an orthographic projection of the second signal line on the first base substrate.

In the embodiments of the present disclosure, the first signal line and the second signal line extend in a same direction.

In the embodiments of the present disclosure, the display panel has a plurality of sub-pixel regions and an inter-sub-pixel region between adjacent sub-pixel regions, the first signal line, the second signal line, and the recess are all in the inter-sub-pixel region.

In the embodiments of the present disclosure, the display panel further includes a gate line, a common electrode line, a data line, a gate lead-in line, and a common electrode lead-in line in the inter-sub-pixel region; the gate lead-in line is configured to lead a scan signal into a corresponding gate line, and the common electrode lead-in line is configured to lead a common signal into a corresponding common electrode line; the gate line and the common electrode line extend in a first direction, and the data line, the gate lead-in line, and the common electrode lead-in line extend in a second direction intersecting the first direction.

In the embodiments of the present disclosure, the gate lead-in line is coupled to the gate line through a first via hole, and the common electrode lead-in line is coupled to the common electrode line through a second via hole.

In the embodiments of the present disclosure, each of the first signal line and the second signal line is one of the gate line, the common electrode line, the data line, the gate lead-in line, and the common electrode lead-in line.

In the embodiments of the present disclosure, from a plan view of the display panel, the recess is located between the gate lead-in line and the common electrode lead.

In the embodiments of the present disclosure, from a plan view of the display panel, the recess is between the data line and the gate lead-in line.

In the embodiments of the present disclosure, the display panel further includes a second spacer between the first substrate and the second substrate; a height of the second spacer is smaller than a height of the first spacer; one end of the second spacer is in contact with one of the first substrate and the second substrate, and the other end of the second spacer is suspended.

In the embodiments of the present disclosure, wherein the first substrate further includes a thin film transistor located in the sub-pixel region on the first base substrate; the thin film transistor includes an active layer, a gate insulating layer, a gate electrode, an interlayer insulating layer, and a source-drain layer sequentially arranged along a direction away from the first base substrate.

In the embodiments of the present disclosure, the gate line, the common electrode line, and the gate are arranged in a same layer and made of a same material; the data line, the gate lead-in line, the common electrode lead-in line, and the source-drain layer are arranged in a same layer and made of a same material.

In the embodiments of the present disclosure, the first substrate further includes a pixel electrode and a common electrode in the sub-pixel region on the first base substrate; the pixel electrode and the common electrode both include strip-shaped electrodes, and are alternately arranged.

In the embodiments of the present disclosure, the pixel electrode, the common electrode, and the gate electrode are arranged in a same layer and made of a same material.

In the embodiments of the present disclosure, the first substrate further includes: a color filter located in the sub-pixel region on the first base substrate; the pixel electrode and the common electrode are both on a side of the color filter away from the first base substrate.

In the embodiments of the present disclosure, the second substrate includes: a second base substrate, and a black matrix on a side of the second base substrate close to the first base substrate; the black matrix is in the inter-sub-pixel region, and an orthographic projection of the black matrix on the first base substrate at least partially overlaps with the orthographic projections of the first signal line and the second signal line on the first base substrate.

In a second aspect, embodiments of the present disclosure provide a display device including a display panel. The display panel includes: a first substrate and a second substrate opposite to each other, and a first spacer between the first substrate and the second substrate, one end of the first spacer is in contact with the first substrate and the other end of the first spacer is in contact with the second substrate; and; a surface of the first substrate close to the second substrate includes a recess, and the end of the first spacer in contact with the first substrate is embedded in the recess.

In a third aspect, embodiments of the present disclosure provide a method for manufacturing a display panel, including:

forming a first substrate, wherein a surface of the first substrate is formed to include a recess;

forming a second substrate;

forming a spacer on the second substrate; and cell-assembling the first substrate and the second substrate such that the spacer is located between the first substrate and the second substrate and is in contact with the first substrate, and an end of the spacer in contact with the first substrate is embedded in the recess.

DETAILED DESCRIPTION

In order to make those skilled in the art understand the technical solutions of the present disclosure better, the present disclosure will be further described in detail below with reference to the accompanying drawings and detailed description.

Unless otherwise defined, the technical or scientific terms used in the present disclosure shall have the usual meanings understand by those skilled in the art to which this disclosure belongs. The words "first", "second", and the like used in the present disclosure are not intended to indicate any order, quantity, or importance, but are only used to distinguish different components. Similarly, the word such as "a", "an", "the" or the like is not intended to mean a quantity limitation, but mean that at least one exists. The word "include", "comprise" or the like means that the element or item appearing before the word encompasses the element or item listed after the word and its equivalents, but does not exclude other elements or items. The words such as "connected", "coupled" and the like are not defined as physical or mechanical connections, but may include electrical connections, whether direct or indirect. The words "up", "down", "left", "right", etc. are only used to indicate the relative position relationship. When the absolute position of the described object changes, the relative position relationship may also change accordingly.

As used herein, the term "sub-pixel region" refers to a light-emitting area of a sub-pixel, such as an area corresponding to a pixel electrode in a liquid crystal display or an area corresponding to a light-emitting layer in an organic light emitting display. The term "inter-sub-pixel region" refers to an area between adjacent sub-pixel regions, such as an area corresponding to a black matrix in a liquid crystal display or an area corresponding to a pixel defining layer in an organic light emitting display. For example, the inter-sub-pixel region may be an area between adjacent sub-pixel regions in the same pixel. For example, the inter-sub-pixel region may also be an area between two adjacent sub-pixel regions from two adjacent pixels.

Figure 1:
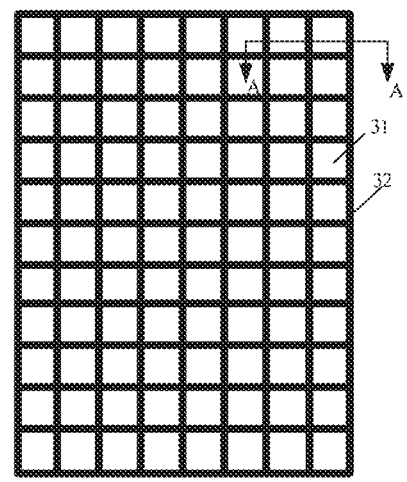
FIG. 1 is a schematic diagram of a structure of an exemplary display panel.
Figure 2:
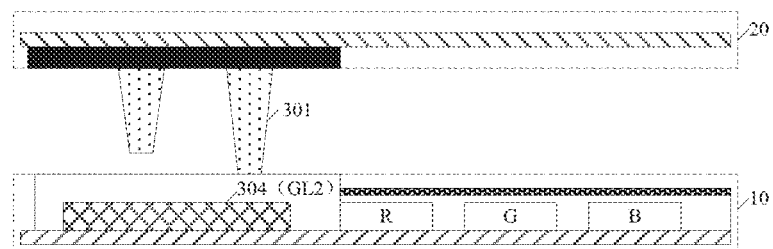
FIG. 2 is a schematic diagram of a cross-sectional structure of the display panel shown in FIG. 1 taken along A-A direction.

FIG. 1 is a schematic diagram of a structure of an exemplary display panel. As shown in FIG. 1, the display panel has a plurality of sub-pixel regions 31 arranged in array and an inter-sub-pixel region 32 located between adjacent sub-pixel regions 31. FIG. 2 is a schematic diagram of a cross-sectional structure of the display panel shown in FIG. 1 taken along A-A direction. As shown in FIG. 2, the display panel includes: a first substrate 10 and a second substrate 20 arranged opposite to each other, a liquid crystal layer located between the first substrate 10 and the second substrate 20, and a spacer 301 located between the first substrate 10 and the second substrate 20. Both ends of the spacer 301 are in contact with the first substrate 10 and the second substrate 20 respectively. For example, the first substrate 10 may be an array substrate, the second substrate 20 may be a color filter substrate, and the spacer 301 may be provided between the array substrate and the color filter substrate to maintain the cell thickness of the liquid crystal layer. A pixel electrode 302, a common electrode 303, and a pixel driving circuit may be provided in the sub-pixel region 31 of the display panel. A signal line 304, such as a gate line GL1, a data line DL, a common electrode line COML1, a gate lead-in line GL2 (only the gate lead-in line GL2 is shown in FIG. 2), a common electrode lead-in line COML2, etc., may be provided in the inter-sub-pixel region 32 of the display panel. The scan signal can be transmitted on the gate line GL1, the data signal can be transmitted on the data line DL, and the common signal can be transmitted on the common electrode line COML1. The gate lead-in line GL2 can transmit the scanning signal to the gate line GL1, and the common electrode lead-in line COML2 can transmit the common signal to the common electrode line COML.

Figure 3:
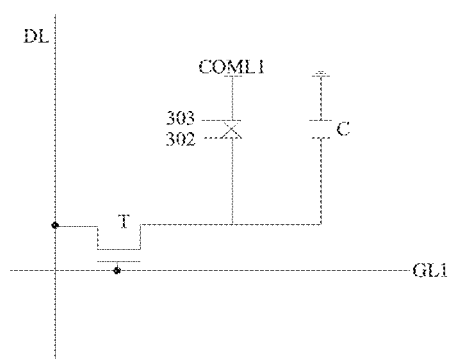
FIG. 3 is a schematic diagram of a structure of an exemplary pixel driving circuit.

FIG. 3 is a schematic diagram of a structure of an exemplary pixel driving circuit. As shown in FIG. 3, the pixel driving circuit includes: a thin film transistor T and a storage capacitor C. A gate electrode of the thin film transistor T is coupled to the gate line GL1, a source electrode of the thin film transistor T is coupled to the data line DL, and a drain electrode of the thin film transistor T is coupled to the pixel electrode 302; one terminal of the storage capacitor C is coupled to the drain of the thin film transistor T, and the other terminal of the storage capacitor C is grounded. The thin film transistor T transmits the data signal transmitted on the data line DL to the pixel electrode 302 in response to the scan signal transmitted on the gate line GL1, and at the same time, the common signal transmitted on the common electrode line COML1 is transmitted to the common electrode 303. The storage capacitor C can maintain the voltage between the pixel electrode 302 and the common electrode 303 in each display period. During the display process, the liquid crystal molecules in the liquid crystal layer can be deflected under the action of the electric field between the pixel electrode 302 and the common electrode 303, and the voltage between the pixel electrode 302 and the common electrode 303 can be adjusted by the data signal to adjust deflection angle of the liquid crystal molecules, and allow the light emitted by the backlight to pass therethrough, thus achieving the display function.

Figure 4:
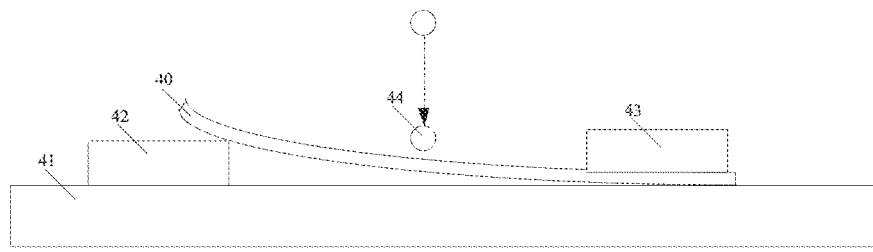
FIG. 4 is a schematic diagram of a display panel in an exemplary ball drop experiment.

At present, the first spacer 301 is generally located above the film layer where the gate line GL1 or the gate lead-in line GL2 is located. After the small ball drop experiment as shown in FIG. 4 or the irregular screen holding operation, the display panel is deformed due to uneven force. FIG. 4 shows that when a cushion block 42 and a pressure block 43 on a platform 41 apply forces on the display panel 40 at the same time, a small ball 44 drops and hits the display panel 40, causing the display panel 40 to be partially deformed.

Figure 5:
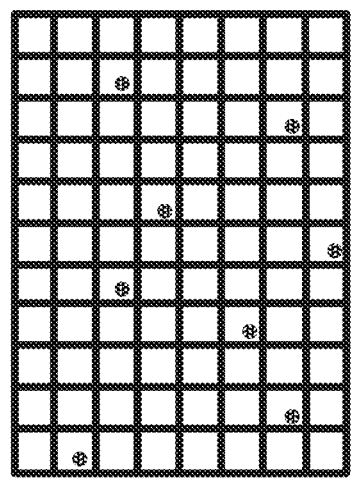
FIG. 5 is a schematic diagram of an exemplary display panel in a poor display state.

This deformation easily causes the first spacer 301 to slide into the sub-pixel region 31 from above the film layer where the gate line GL1 or the gate lead-in line GL2 is located. The first spacer 301 will undergo a certain elastic recovery from its original compressed state. However, due to the small cell thickness of the liquid crystal cell, the first spacer 301 that recovers from its elastic deformation will press against the array substrate and slide left and right. As a result, the alignment layer in the sub-pixel region 31 of the array substrate is scratched, and the liquid crystal in the scratched area loses its original anchoring force. Accordingly, the liquid crystal at the scratched area is arranged disorderly due to the lack of alignment force, a certain degree of light leakage occurs in the display panel, and the defect of bright spots are likely to appear in the corresponding position during the display process (as shown in the circular shadows in FIG. 5).

In order to solve at least one of the above technical problems, the embodiments of the present disclosure provide a display panel, a manufacturing method thereof, and a display device. The display panel, the manufacturing method thereof, and the display device provided by the embodiments of the present disclosure will be described in further detail below with reference to the accompanying drawings and detailed description.

Figure 6:
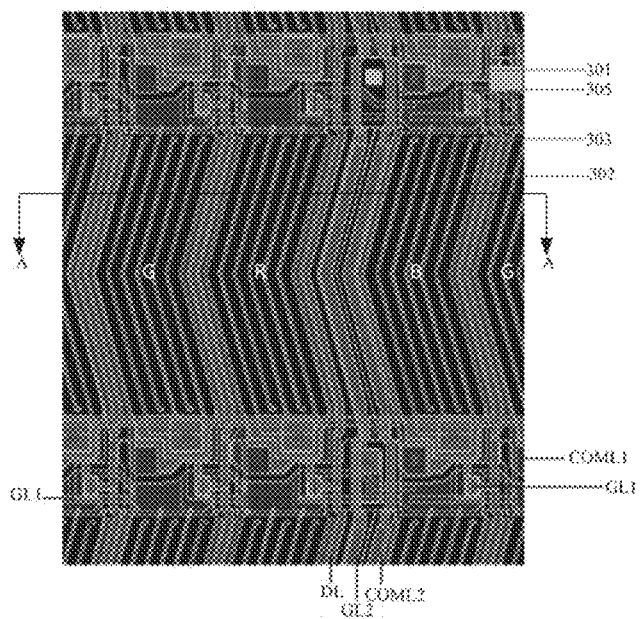
FIG. 6 is a schematic diagram of a structure of a display panel according to an embodiment of the present disclosure.
Figure 7:
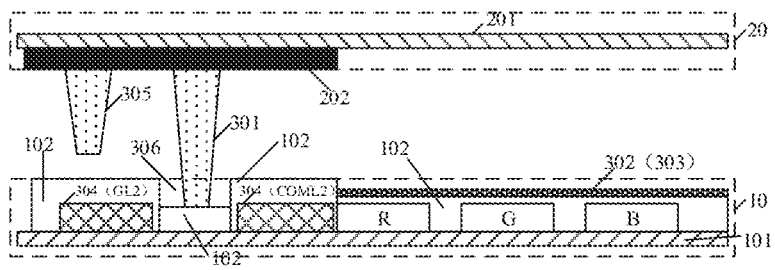
FIG. 7 is a schematic diagram of a cross-sectional structure of the display panel shown in FIG. 6 taken along A-A direction.

In one aspect, an embodiment of the present disclosure provides a display panel. FIG. 6 is a schematic diagram of a structure of a display panel according to an embodiment of the present disclosure, and FIG. 7 is a schematic diagram of a cross-sectional structure of the display panel shown in FIG. 6 taken along A-A direction. As shown in FIG. 6 and FIG. 7, the display panel includes: a first substrate 10 and a second substrate 20 arranged opposite to each other, and a first spacer 301 located between the first substrate 10 and the second substrate 20; both ends of the spacer 301 are in contact with the first substrate 10 and the second substrate 20 respectively; a surface of the first substrate 10 close to the second substrate 20 is formed with a recess 306; the end of the first spacer 301 in contact with the first substrate 10 is embedded in the recess 306.

Figure 8:
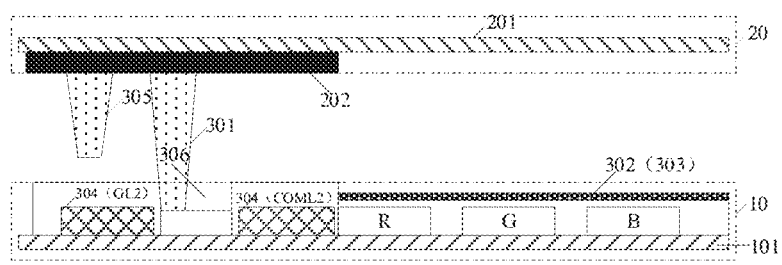
FIG. 8 is a schematic diagram of a structure of a display panel under stress according to an embodiment of the present disclosure.
Figure 9:
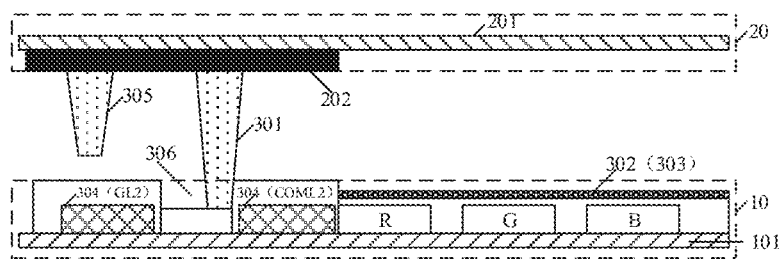
FIG. 9 is another schematic diagram of a structure of a display panel under stress according to an embodiment of the present disclosure.

The description that the end of the first spacer 301 in contact with the first substrate 10 is embedded in the recess 306 means that the first spacer 301 is located and restricted in the recess 306. As shown in FIGS. 8 and 9, when the display panel is subjected to an external force, the first spacer 301 may move. Due to the fixing effect of the recess 306, the first spacer 301 will not move to the sub-pixel region 31 of the array substrate with the deviation of the color filter substrate and scratch the alignment layer in the sub-pixel region 31. Therefore, it is possible to prevent the liquid crystal arrangement in the sub-pixel region 31 in the liquid crystal layer from being disordered and causing light leakage, and thus to avoid the occurrence of the defect of bright spots in the display panel during the display process.

Referring again to FIG. 6, the display panel may have a plurality of sub-pixel regions 31 and an inter-sub-pixel region 32 located between the sub-pixel regions 31.

Referring to FIG. 7, the first substrate 10 includes: a first base substrate 101, and a plurality of signal lines 304 located in the inter-sub-pixel region 32 on the first base substrate 101, and the orthographic projection of the recess 306 on the first base substrate 101 is located between the orthographic projections of two adjacent signal lines 304 on the first base substrate 101. In some embodiments, the plurality of signal lines 304 includes a first signal line and a second signal line.

In some embodiments, as shown in FIG. 7, the first substrate 10 further includes a protective layer 102; the protective layer includes a first portion located on the first signal line and the second signal line, and a second portion located between the first signal line and the second signal line, the distance between the surface of the second portion facing the second substrate and the first base substrate is smaller than the distance between the surface of the first portion facing the second substrate and the first base substrate, and the surface of the second portion facing the second substrate is the recess 306.

In the inter-sub-pixel region 32, the protective layer 102 covers the data line DL, the gate lead-in line DL2, and the common electrode lead-in lire COML2, and a groove is formed at a position corresponding to the recess 306; in the sub-pixel region 31, the protective layer 102 covers the color filters and is located between the color filters and the layer where the pixel electrode 302 and the common electrode 303 are located. In an embodiment of the present disclosure, the protective layer includes a first portion located on the first signal line and the second signal line, and a second portion located between the first signal line and the second signal line, the distance between the surface of the second portion facing the second substrate and the first base substrate is smaller than the distance between the surface of the first portion facing the second substrate and the first base substrate, and the surface of the second portion facing the second substrate is the recess 306.

The protective layer 102 can be formed of an organic material. On the one hand, it can protect the signal lines and color filters it covers. On the other hand, it can prevent short circuits between adjacent signal lines, and avoid the interference between signals transmitted on adjacent signal lines, which affects the display function. For example, the protective layer 102 can be formed using resin, photoresist, or the like.

In some embodiments, the plurality of signal lines 304 include a first signal line and a second signal line, a first edge of the orthographic projection of the recess 306 on the first base substrate 101 overlaps with the edge, close to the recess 306, of the orthographic projection of the first signal line on the first base substrate 101; and a second edge, which is opposite to the first edge, of the orthographic projection of the recess 306 on the first base substrate 101 overlaps with the edge of the orthographic projection, close to the recess 306, of the second signal line on the first base substrate 101.

In some embodiments, the plurality of signal lines 304 include a first signal line and a second signal line, the first edge of the orthographic projection of the recess 306 on the first base substrate 101 is spaced apart from the edge of the orthographic projection, close to the recess 306, of the first signal line on the first base substrate 101; and the second edge, which is opposite to the first edge, of the orthographic projection of the recess 306 on the first base substrate 101 is spaced apart from the edge, close to the recess 306, of the orthographic projection of the second signal line on the first base substrate 101.

In some embodiments, the first signal line and the second signal line extend in the same direction.

It should be noted here that the display panel provided by the embodiment of the present disclosure may be applicable to a display panel implemented in a liquid crystal mode in the related art, for example, a Twisted Nematic (TN) display panel, a Vertical Alignment (VA) display panel, an In-Plane Switching (IPS) display panel or an Advanced Super Dimension Switch (ADS) display panel, especially suitable for an SF-ADS display panel. The detailed description will be described in detail in the following embodiments.

In the display panel according to the embodiment of the present disclosure, the plurality of signal lines 304 are provided in the inter-sub-pixel region 32, at least part of the signal lines 304 may extend in a first direction and be arranged to be spaced apart from each other in a second direction that is different from the first direction. After the signal lines spaced apart from each other are formed on a film layer, since the signal lines 304 have a certain thickness, a groove is formed between adjacent signal lines 304, and when other film layers are formed subsequently, the other film layers naturally sink between two adjacent signal lines 304, so that a recess 306 can be formed between the adjacent signal lines 304.

In some embodiments, as shown in FIG. 6, the signal line 304 includes: the gate line GL1 and the common electrode line COML1 extending in the row direction, and the data line DL, the gate lead-in line GL2 and the common electrode lead-in line COML2 extending in the column direction; the gate lead-in line GL2 is coupled to the gate line GL1 through the first via hole, and the common electrode lead-in line COML2 is coupled to the common electrode line COML1 through the second via hole.

The scan signal can be transmitted on the gate line GL1, the data signal can be transmitted on the data line DL, and the common signal can be transmitted on the common electrode line COML1. The scan signal can be provided by the gate driving circuit, the data signal can be provided by the source driving circuit, and the common signal is a constant voltage signal and can be provided by the power supply circuit. In the embodiments of the present disclosure, in order to avoid short circuits between signal lines in different film layers, an interlayer insulating layer is provided between the gate lead-in line GL2 and the gate line GL1, and between the common electrode lead-in line COML2 and the common electrode line COML1, the gate lead-in line GL2 may be coupled to the gate line GL1 through the first via hole penetrating through the interlayer insulating layer, and the common electrode lead-in line COML2 is coupled to the common electrode line COML1 through the second via hole penetrating through the interlayer insulating layer. Since the data line DL, the gate lead-in line GL2 and the common electrode lead-in line COML2 are all arranged in the column direction, the gate lead-in line GL2 is used to lead the scan signal to the corresponding gate line GL1, the common electrode lead-in line COML2 is used to lead the common signal to the corresponding common electrode line COML1, therefore the gate driving circuit, the power supply circuit, and the source driving circuit can be arranged on the same side of the display panel, thereby reducing the width of the other three sides, and realizing an ultra-narrow bezel or even a borderless display panel design. For now the bezel of the display panel can be 0.9 mm.

In some embodiments, as shown in FIG. 6 and FIG. 7, the orthographic projection of the recess 306 on the first base substrate 101 is located between the orthographic projections of the adjacent gate lead-in line GL2 and common electrode lead-in line COML2 on the first base substrate 101; or the orthographic projection of the recess 306 on the first base substrate 101 is located between the orthographic projections of the adjacent data line DL and gate lead-in line GL2 on the first base substrate 101.

In some embodiments, the data line DL, the gate lead-in line GL2 and the common electrode lead-in line COML2 can be arranged in the same layer, the recess 306 can be formed between the adjacent data line DL and gate lead-in line GL2, the recess 306 can be formed between the adjacent gate lead-in line GL2 and common electrode lead-in line COML2, the first spacer 301 may be embedded in the recess 306 which is formed between the data line DL and the gate lead-in line GL2, or the first spacer 301 may be embedded in the recess 306 which is formed between the adjacent gate lead-in line GL2 and common electrode lead-in line COML2. The first spacer 301 is located and restricted in the recess 306. When the display panel receives an external three, the first spacer 301 may move. Due to the fixing effect of the recess 306, the first spacer 301 will not move to the sub-pixel region 31 of the array substrate with the deviation of the color filter substrate and scratch the alignment layer in the sub-pixel region 31. Therefore, it is possible to prevent the liquid crystal arrangement in the corresponding position in the liquid crystal layer from being disordered and causing light leakage, thereby preventing the display panel from showing the defect of bright spots during the display process. It can be understood that the above-mentioned signal lines may also be other types of signal lines, such as power supply voltage lines, reset signal lines, initialization signal lines, etc., which will not be listed here.

In some embodiments, as shown in FIG. 7, the display panel further includes a second spacer 305 located between the first substrate 10 and the second substrate 20; the height of the second spacer 305 is smaller than the height of the first spacer 301; one end of the second spacer 305 is in contact with the first substrate 10 or the second substrate 20, and the other end of the second spacer 305 is suspended.

In practical applications, when the display panel is not subjected to external force, the two ends of the first spacer 301 are in contact with the first substrate 10 and the second substrate 20 respectively; only one end of the second spacer 305 is in contact with the first substrate 10 or the second substrate 20, and the other end of the second spacer 305 is suspended. The first spacer 301 may provide support between the first substrate 10 and the second substrate 20 to maintain the cell thickness of the liquid crystal layer. When the display panel is subjected to an external force, the first spacer 301 will be compressed. At this time, both ends of the second spacer 305 may be in contact with the first substrate 10 and the second substrate 20 respectively to maintain the cell thickness of the liquid crystal layer, and the external force received by the display panel can be dispersed and buffered, so as to prevent the display panel from being damaged due to the external fierce to affect the display effect.

In some embodiments, the first substrate 10 further includes: a thin film transistor T located in the sub-pixel region 31 on the first base substrate 101; the thin film transistor T includes: an active layer, a gate insulating layer, a gate electrode, an interlayer insulating layer, and a source-drain layer that are sequentially arranged along a direction away from the first base substrate 101; the gate line GL1, the common electrode line COML1, and the gate electrode are arranged in the same layer and made of the same material; the data line DL, the gate lead-in line GL2, the common electrode lead-in line COML1, and the source-drain layer are arranged in the same layer and made of the same material.

The material of the gate electrode of the thin film transistor T may include a metal material or an alloy material, such as molybdenum, aluminum, titanium and the like. The material of the source-drain layer may include a metal material or an alloy material, such as a metal single-layer or multi-layer structure formed of molybdenum, aluminum, titanium, etc. For example, the multi-layer structure is a multi-layer metal stack, such as a three-layer metal stack of titanium, aluminum, and titanium (Ti/Al/Ti). The gate line GL1, the common electrode line COML1, and the gate electrode are arranged in the same layer and made of the same material; the data line DL, the gate lead-in line GL2, the common electrode lead-in line COML1, and the source-drain layer are arranged in the same layer and made of the same material. They can be formed at one time by the same process, thereby reducing the manufacturing steps and saving the manufacturing cost.

In some embodiments, as shown in FIG. 6 and FIG. 7, the first substrate 10 further includes: a pixel electrode 302 and a common electrode 303 located in the sub-pixel region 31 on the first base substrate 101; both the pixel electrode 302 and the common electrode 303 include strip-shaped electrodes and are arranged alternately.

The pixel electrode 302 and the common electrode 303 may both be strip-shaped electrodes, and the strip-shaped electrodes serving as the pixel electrode and the strip-shaped electrodes serving as the common electrode are arranged alternately. During the display process, the pixel electrode 302 is input with a data signal, and the common electrode 303 is input with a common signal, a plane electric field can be generated between the pixel electrode 302 and the common electrode 303, and the liquid crystal molecules in the liquid crystal layer can be deflected under the action of the plane electric field between the pixel electrode 302 and the common electrode 303, and the voltage between the pixel electrode 302 and the common electrode 303 is adjusted by the data signal to adjust the deflection angle of the liquid crystal molecules so as to transmit the light emitted by the backlight, thereby realizing the display function.

In some embodiments, the pixel electrode 302, the common electrode 303, and the gate electrode are arranged in the same layer and made of the same material, and can be manufactured at one time by the same process, thereby reducing the manufacturing steps and saving the manufacturing cost.

In some embodiments, as shown in FIG. 7, the first substrate 10 further includes: color filters located in the sub-pixel region 31 on the first base substrate 101; the pixel electrode 302 and the common electrode 303 are both located on the side of the color filters away from the first base substrate 101.

It should be noted that the color filters may include a red filter R, a green filter G, and a blue filter B. The white light generated by the backlight can be filtered into monochromatic light, such as red light, green light, and blue light. The colorful display of the display panel is realized by controlling the transmittance of light of different colors. It can be understood that the above-mentioned color filters can also be located in the second substrate 20, and have same function and effect as above, which will not be repeated here.

In some embodiments, as shown in FIG. 7, the second substrate 20 includes: a second base substrate 201, and a black matrix 202 located in the inter-sub-pixel region 32 on the side of the second base substrate 201 close to the first base substrate 101; the orthographic projection of the black matrix 202 on the first base substrate 101 at least partially overlaps with the orthographic projection of the signal line 304 on the first base substrate 101. In the embodiment of the present disclosure, the orthographic projection of the black matrix 202 on the first base substrate 101 completely covers the orthographic projection of the signal line 304 on the first base substrate 101.

It should be noted that the black matrix 202 can be formed of a non-transparent organic material, which can shield light to avoid crosstalk between light of different colors which affects the display effect. At the same time, the black matrix 202 can also prevent ambient light from reaching the signal line 304, thereby preventing the signal line 304 from reflecting the light and affecting the display effect.

In another aspect, embodiments of the present disclosure provide a display device including a display panel. The display panel includes: a first substrate and a second substrate arranged opposite to each other, and a first spacer located between the first substrate and the second substrate, both ends of the first spacer are in contact with the first substrate and the second substrate respectively; a surface of the first substrate close to the second substrate includes a recess, and an end of the first spacer in contact with the first substrate is embedded in the recess.

In another aspect, embodiments of the present disclosure provide a method for manufacturing a display panel, including:

forming a first substrate, a surface of which is formed with a recess;

forming a second substrate;

forming a spacer on the second substrate; and cell-assembling the first substrate and the second substrate such that the spacer is located between the first substrate and the second substrate and is in contact with the first substrate, and an end of the spacer in contact with the first substrate is embedded in the recess.

The display device can be an electronic device with a display panel such as a mobile phone, a tablet computer, an electronic watch, a sports bracelet, a notebook computer, etc.; the manufacturing method of the corresponding display panel may be a manufacturing method of display panels of electronic devices such as mobile phones, tablet computers, electronic watches, sports bracelets, and notebook computers. For the implementation principles and technical effects of the display device and the manufacturing method, reference may be made to the above-mentioned discussion on the implementation principles and technical effects of the display panel, which will not be repeated here.

It can be understood that the above-mentioned implementations are merely exemplary implementations which are used to illustrate the principle of the present disclosure, but the present disclosure is not limited thereto. For those of ordinary skill in the art, various modifications and improvements can be made without departing from the spirit and essence of the present disclosure, and the modifications and improvements are also considered to be within the protection scope of the present disclosure.

What is claimed is:

1. A display panel, comprising a first substrate and a second substrate opposite to each other, and a first spacer between the first substrate and the second substrate,
   wherein one end of the first spacer is in contact with the first substrate and the other end of the first spacer is in contact with the second substrate;
   a surface of the first substrate close to the second substrate comprises a recess, and the end of the first spacer in contact with the first substrate is embedded in the recess;
   the display panel further comprises a gate line, a common electrode line, a data line, a gate lead-in line, and a common electrode lead-in line, the gate lead-in line is configured to lead a scan signal into a corresponding gate line, and the common electrode lead-in line is configured to lead a common signal into a corresponding common electrode line;
   the first substrate comprises a first base substrate, and a first signal line and a second signal line on the first base substrate, and an orthographic projection of the recess on the first base substrate is between orthographic projections of the first signal line and the second signal line on the first base substrate; and
   each of the first signal line and the second signal line is one of the gate line, the common electrode line, the data line, the gate lead-in line, and the common electrode lead-in line.

2. The display panel of claim 1, wherein
   the first substrate further comprises a protective layer on a side of the first signal line and the second signal line away from the first base substrate;
   the protective layer comprises a first portion on the first signal line and the second signal line, and a second portion between the first signal line and the second signal line;
   a distance between a surface of the second portion facing the second substrate and the first base substrate is smaller than a distance between a surface of the first portion facing the second substrate and the first base substrate; and
   the surface of the second portion facing the second substrate is the recess.

3. The display panel of claim 1, wherein
   a first edge of the orthographic projection of the recess on the first base substrate overlaps with an edge, close to the recess, of an orthographic projection of the first signal line on the first base substrate, and
   a second edge, opposite to the first edge, of the orthographic projection of the recess on the first base substrate overlaps with an edge, close to the recess, of an orthographic projection of the second signal line on the first base substrate.

4. The display panel of claim 1, wherein
   the first signal line and the second signal line extend in a same direction.

5. The display panel of claim 4, wherein
   the display panel has a plurality of sub-pixel regions and an inter-sub-pixel region between adjacent sub-pixel regions, and
   the first signal line, the second signal line, and the recess are all in the inter-sub-pixel region.

6. The display panel of claim 5, wherein
   the gate line, the common electrode line, the data line, the gate lead-in line, and the common electrode lead-in line are in the inter-sub-pixel region; and
   the gate line and the common electrode line extend in a first direction, and the data line, the gate lead-in line, and the common electrode lead-in line extend in a second direction intersecting the first direction.

7. The display panel of claim 6, wherein
   the gate lead-in line is coupled to the gate line through a first via hole, and the common electrode lead-in line is coupled to the common electrode line through a second via hole.

8. The display panel of claim 6, wherein
   the first substrate further comprises a thin film transistor in the sub-pixel region and on the first base substrate; and
   the thin film transistor comprises an active layer, a gate insulating layer, a gate electrode, an interlayer insulating layer, and a source-drain layer sequentially arranged along a direction away from the first base substrate.

9. The display panel of claim 8, wherein
   the gate line, the common electrode line, and the gate are arranged in a same layer and made of a same material; and
   the data line, the gate lead-in line, the common electrode lead-in line, and the source-drain layer are arranged in a same layer and made of a same material.

10. The display panel of claim 8, wherein
    the first substrate further comprises a pixel electrode and a common electrode in the sub-pixel region on the first base substrate; and
    the pixel electrode and the common electrode both comprise strip-shaped electrodes, and are alternately arranged.

11. The display panel of claim 10, wherein
    the pixel electrode, the common electrode, and the gate electrode are arranged in a same layer and made of a same material.

12. The display panel of claim 10, wherein
    the first substrate further comprises: a color filter in the sub-pixel region on the first base substrate; and
    the pixel electrode and the common electrode are both on a side of the color filter away from the first base substrate.

13. The display panel of claim 5, wherein
    the second substrate comprises: a second base substrate, and a black matrix on a side of the second base substrate close to the first base substrate; and
    the black matrix is in the inter-sub-pixel region, and an orthographic projection of the black matrix on the first base substrate at least partially overlaps with the orthographic projections of the first signal line and the second signal line on the first base substrate.

14. The display panel of claim 1, wherein
    from a plan view of the display panel, the recess is between the gate lead-in line and the common electrode lead-in line.

15. The display panel of claim 1, wherein from a plan view of the display panel, the recess is between the data line and the gate lead-in line.

16. The display panel of claim 1, wherein
the display panel further comprises a second spacer between the first substrate and the second substrate;
a height of the second spacer is smaller than a height of the first spacer; and
one end of the second spacer is in contact with one of the first substrate and the second substrate, and the other end of the second spacer is suspended.

17. A display device comprising a display panel, wherein
the display panel comprises: a first substrate and a second substrate opposite to each other, and a first spacer between the first substrate and the second substrate;
one end of the first spacer is in contact with the first substrate and the other end of the first spacer is in contact with the second substrate;
a surface of the first substrate close to the second substrate comprises a recess, and the end of the first spacer in contact with the first substrate is embedded in the recess;
the display panel further comprises a gate line, a common electrode line, a data line, a gate lead-in line, and a common electrode lead-in line, the gate lead-in line is configured to lead a scan signal into a corresponding gate line, and the common electrode lead-in line is configured to lead a common signal into a corresponding common electrode line;
the first substrate comprises a first base substrate, and a first signal line and a second signal line on the first base substrate, and an orthographic projection of the recess on the first base substrate is between orthographic projections of the first signal line and the second signal line on the first base substrate; and
each of the first signal line and the second signal line is one of the gate line, the common electrode line, the data line, the gate lead-in line, and the common electrode lead-in line.

18. A method for manufacturing a display panel, comprising:
forming a first substrate, wherein a surface of the first substrate is formed to comprise a recess;
forming a second substrate;
cell-assembling the first substrate and the second substrate such that the first substrate and the second substrate are opposite to each other, a spacer provided between the first substrate, one end of the spacer is in contact with the first substrate and the other end of the spacer is in contact with the second substrate, and the end of the spacer in contact with the first substrate is embedded in the recess,
wherein the method further comprises forming a gate line, a common electrode line, a data line, a gate lead-in line, and a common electrode lead-in line, the gate lead-in line is configured to lead a scan signal into a corresponding gate line, and the common electrode lead-in line is configured to lead a common signal into a corresponding common electrode line;
the first substrate is formed to comprise a first base substrate, and a first signal line and a second signal line on the first base substrate, and an orthographic projection of the recess on the first base substrate is between orthographic projections of the first signal line and the second signal line on the first base substrate; and
each of the first signal line and the second signal line is one of the gate line, the common electrode line, the data line, the gate lead-in line, and the common electrode lead-in line.

* * * * *